(12) United States Patent
Patterson

(10) Patent No.: US 6,910,649 B2
(45) Date of Patent: Jun. 28, 2005

(54) METHOD AND APPARATUS FOR CREATING AND DISPENSING A FEED RATION TO LIVESTOCK

(76) Inventor: R. C. Patterson, P.O. Box 147, Kim, CO (US) 81049

(*) Notice: Subject to any disclaimer, the term of this patent is extended or adjusted under 35 U.S.C. 154(b) by 39 days.

(21) Appl. No.: 10/255,030

(22) Filed: Sep. 25, 2002

(65) Prior Publication Data

US 2003/0025011 A1 Feb. 6, 2003

Related U.S. Application Data

(63) Continuation-in-part of application No. 09/444,620, filed on Nov. 22, 1999, now Pat. No. 6,467,710, which is a continuation-in-part of application No. 09/245,546, filed on Feb. 5, 1999, now Pat. No. 6,086,001.

(51) Int. Cl.[7] .............................................. B02C 18/06
(52) U.S. Cl. ..................................... 241/101.6; 241/135
(58) Field of Search ......................... 241/101.6, 101.76, 241/135; 366/603

(56) References Cited

U.S. PATENT DOCUMENTS

| | | | | |
|---|---|---|---|---|
| 4,092,004 A | * | 5/1978 | Leverenz et al. | ............. 241/56 |
| 4,376,515 A | * | 3/1983 | Soe | ......................... 241/101.8 |
| 4,577,805 A | * | 3/1986 | Seymour | ................. 241/101.8 |
| 5,813,616 A | * | 9/1998 | Vandervalk | ............ 241/101.76 |

* cited by examiner

Primary Examiner—Lowell A. Larson
(74) Attorney, Agent, or Firm—John E. Toupal; Harold G. Jarcho

(57) ABSTRACT

A mobile apparatus for combining and dispensing different livestock feeds including roughage, particulate matter and liquids. A control system provides and weighs selected ratios of combined feed sources to establish a desired ration.

17 Claims, 12 Drawing Sheets

METHOD AND APPARATUS FOR CREATING AND DISPENSING A FEED RATION TO LIVESTOCK

This Application is a Continuation-in-Part of U.S. Pat. No. 6,086,001 and U.S. patent application Ser. No. 09/444,620 filed Nov. 22, 1999 which is a CIP Application of Ser. No. 09/245,546 filed Feb. 5, 1999 now U.S. Pat. No. 6,467,710.

BACKGROUND OF THE INVENTION

The present invention relates to an apparatus for processing and selectively combining various feed materials to create a desired ration for delivery to livestock.

In modern agricultural practice, it is considered advantageous to process roughage to be fed to livestock. It is also considered advantageous to use more than one feed course to create a ration providing the animals' proper nutritional requirements. It is further necessary to deliver the ration to the animals.

U.S. Pat. No. 6,086,001 discloses a mobile apparatus for processing, combining and delivering multiple sources of roughage for consumption by livestock. Included with the apparatus is a control system for selectively varying the relative contribution of each source to thereby provide an efficient feed ration of desired nutritional content. A more versatile mobile apparatus with provision for including a particulate food material to such a ration is disclosed in U.S. patent application Ser. No. 09/444,620.

The object of this invention is to provide an improved mobile apparatus for mixing and combining multiple feed sources for delivery to livestock.

SUMMARY OF THE INVENTION

The invention is a roughage bale processing and dispensing method including the steps of providing one bale of roughage having a given nutritional value; providing a source of particulate feed material; conveying the feed material to a discharge region at a given quantity rate; conveying the one bale into a shredder mechanism at a given speed; simultaneously conveying the resultant shredded content of the one bale to the discharge region for combination with the feed material; and selectively controlling the ratio of the given speed to the given rate dependent upon the relative nutritional values of the one bale and the feed material. The method creates an economical feed ration having a desired nutritional content.

According to one feature, the method includes the steps of providing another bale of roughage having a predetermined nutritional value substantially different than the given nutritional value; simultaneously conveying the another bale into the shredder mechanism at a predetermined speed different than the given speed; and combining the resultant shredded content of the another bale with the shredded content of the one bale and said feed material. Combining the second bale allows more versatility in the creation of the ration.

According to another feature of the invention, the conveying steps include the steps of loading the one bale onto a first conveyor arranged to feed the one bale into the shredder mechanism, loading the another bale onto a second conveyor arranged to feed the another bale into the shredder mechanism, and controlling the ratio of the given speed to the predetermined speed dependent upon the relative nutritional value of the one and another bales. These steps facilitate the creation of a desired roughage portion of the ration.

According to further features, the combining steps include the steps of feeding the shredded contents onto a third conveyor arranged to convey the contents to the discharge region, transporting the feed material to the discharge region with a conveyor system and selectively controlling the rate at which the conveyor system transports the feed material. This method facilitates creation of an economical feed ration having desired proportions of multiple roughage feeds and a particulate feed.

The invention also encompasses a feeding apparatus including a mobile frame defining one section for supporting a first feed material and another section for supporting a second feed material; a primary conveyor for discharging the first feed material from the mobile frame at a first discharge rate; an auxiliary conveyor for discharging the second feed material from the mobile frame at a second discharge rate, and wherein the primary and auxiliary conveyors are arranged to combine the discharged first and second feed materials. Also included is a control system for selectively varying the ratio of the first and second discharge rates. The apparatus creates and dispenses an economical feed ration.

According to one feature of the apparatus, the one section is adapted to support a bale of roughage and the primary conveyor means comprises a shredder, a first conveyor for moving the bale into the shredder, and a conveyor system for receiving from the shredder the shredded content of the roughage and discharging the shredded content from the mobile frame.

According to another feature, the another section supports another bale of roughage and the auxiliary conveyor includes a second conveyor for moving the another bale into the shredder. This feature facilitates creation of a desired feed ration with multiple roughage sources.

According to a different feature, the another section supports particulate feed material, and the auxiliary conveyor includes a discharge chute, and an auger for moving the particulate feed material out of the discharge chute. This feature facilitates creation of a desired feed ration with roughage and particulate material sources.

According to a further feature, the apparatus includes a tank for liquid mounted on the mobile frame, and a liquid dispensing system for circulating liquid feed from the tank onto the shredded content of the roughage. The addition of liquid creates a more palatable and uniform ration with roughage and particulate feed by causing the particulate matter to adhere to the roughage.

According to an important feature of the invention, the apparatus includes scales for weighing the different feed materials being combined. The scales allow the more accurate creation of feed rations having desired nutritional value.

DESCRIPTION OF THE DRAWINGS

These and other objects and features of the invention will become more apparent upon a perusal of the following description taken in conjunction with the accompanying drawings. In the drawings, closely related figures have the same number but different alphabetic suffixes.

DESCRIPTION OF THE PREFERRED EMBODIMENT

Figure 1:
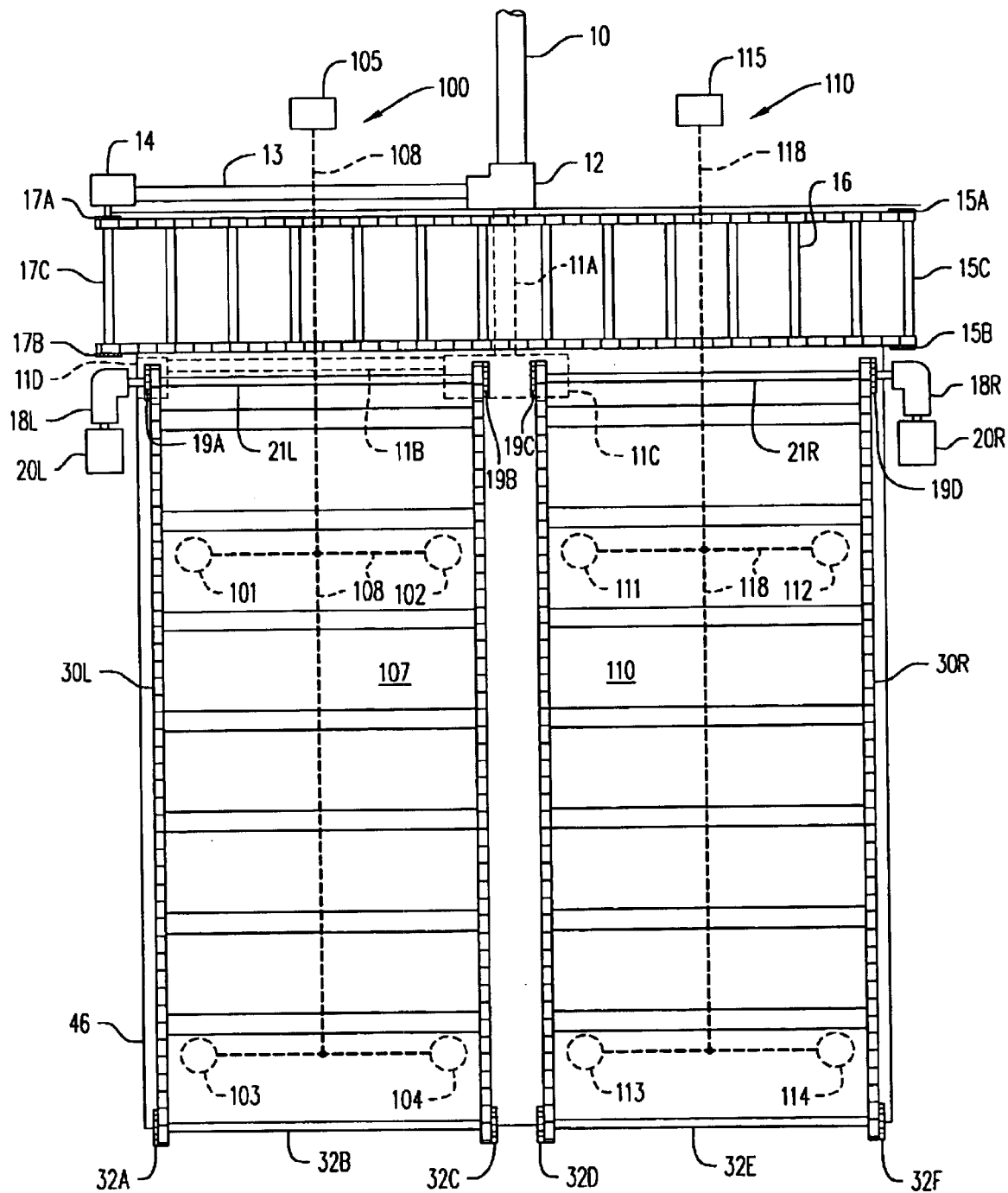
FIG. 1 is a plan view of a preferred embodiment of the invention.
Figure 2:
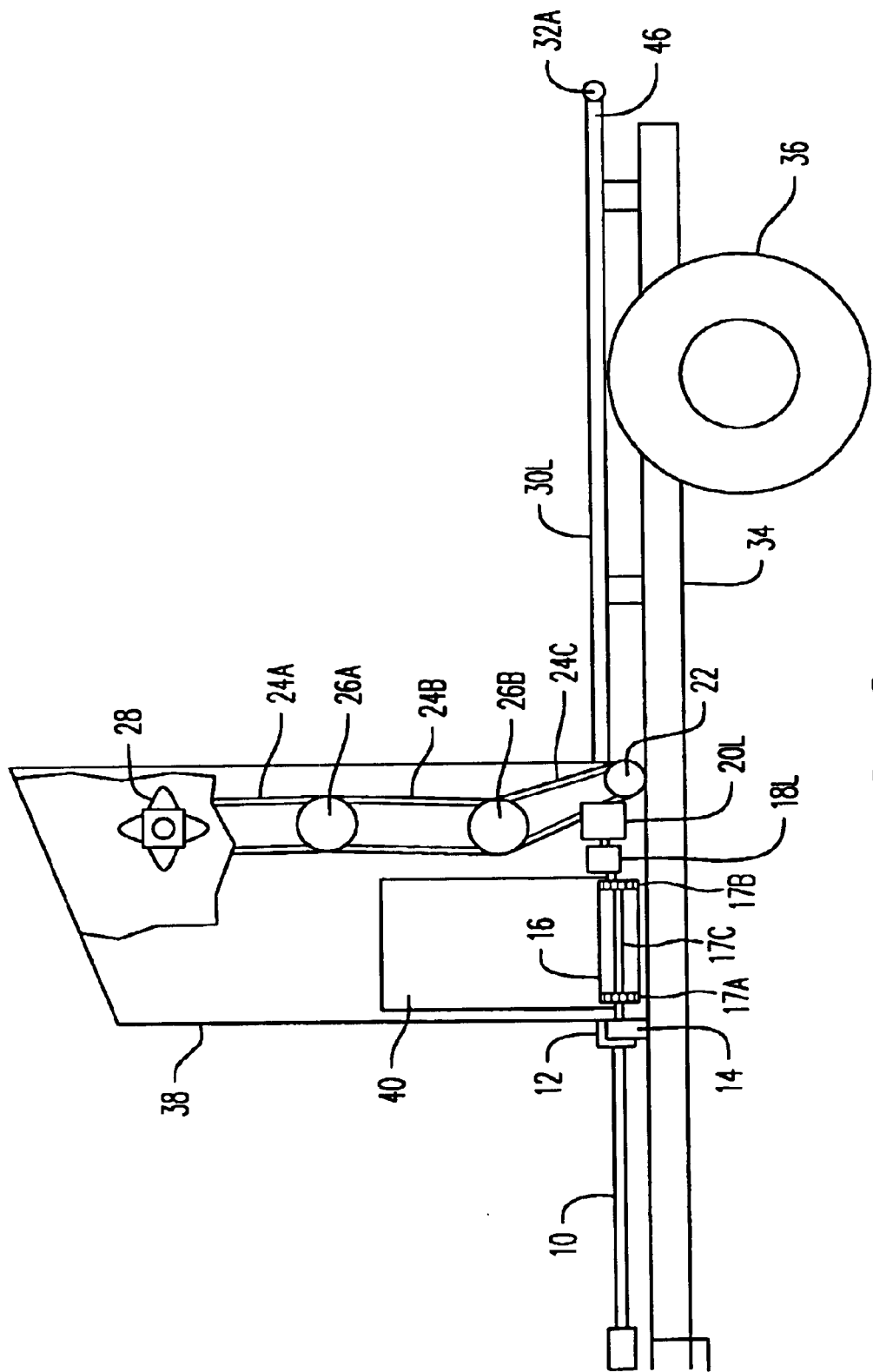
FIG. 2 is a side elevational view of the embodiment shown in FIG. 1.

A preferred embodiment of the present invention is illustrated in FIG. 1 (plan view) and FIG. 2 (side elevational view). In FIG. 1, a mobile frame 34 with wheels 36 (FIG. 2) includes first and second parallel translational conveyor chains 30L and 30R, turning on idler gears 32A, 32C, 32D, 32F, and idler shafts 32B and 32E and driven by drive gears 19A, 19B, 19C, 19D and drive shafts 21L and 21R which are connected to right-angle gear boxes 18L and 19R which are connected to hydraulic motor 20L and hydraulic motor 20R. Another translational conveyor system chain 16 is directed transversely to the first and second chains 30L, 30R and turns on idler gears 15A, 15B, and idler shaft 15C and is driven by drive gears 17A, 17B, attached to drive shaft 17C which is connected to right-angle gear box 14 which is connected to shaft 13 which is connected to double-out gear box 12 which is connected to PTO shaft 10 which is connected to tractor PTO power output shaft (not shown).

In FIG. 2, the mobile frame 34 includes a transport hood 38 which covers three vertically spaced apart shredders 28, driven by, respectively, chains 24A, 24B, and 24C and gears 26A and 26B which are driven by gear 22 which is connected to gear box 11D which is connected to shaft 11B which is connected to right-angle gear box 11C which is connected to shaft 11A which is connected to double-out gear box 12 which is driven by PTO shaft 10 which connects to PTO output shaft on the tractor (not shown). Conveyor chain 16 discharges processed ration through discharge opening 40.

Figure 3:
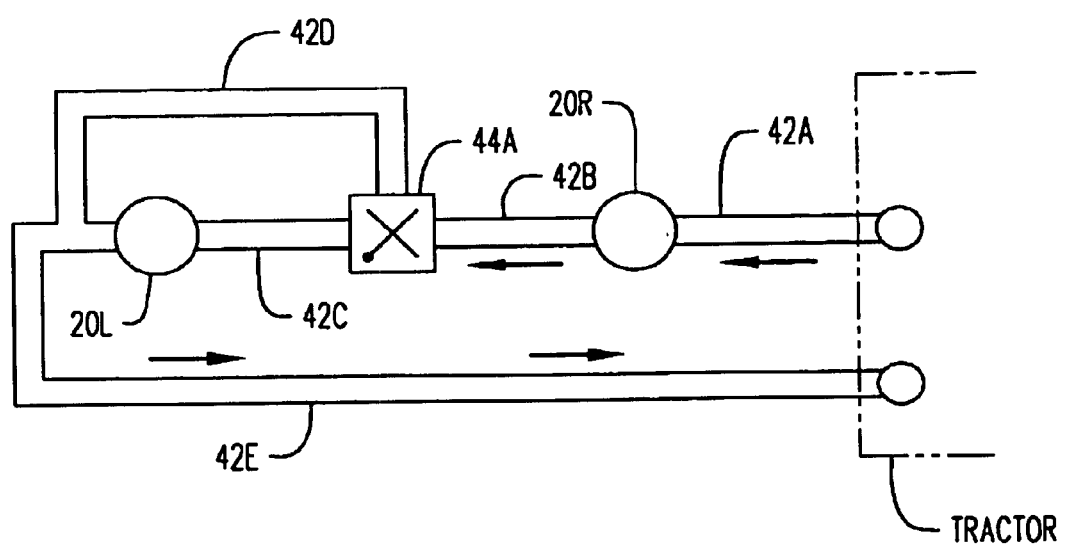
FIG. 3 is a schematic view of a hydraulic system of the embodiment shown in FIGS. 1 and 2.

In FIG. 3, hydraulic hose 42A connects tractor hydraulic system (not shown) to hydraulic motor 20R which is connected to hydraulic hose 42B connected to flow control divertor 44A which is connected to hydraulic hose 42C connected to hydraulic motor 42L connected to hydraulic hose 42E which is connected to return side of hydraulic system on tractor (not shown). Hydraulic hose 42D connects flow control divertor to hydraulic hose 42E.

OPERATION

FIG. 1 shows two continuous floor chains 30R and 30L. Each one is wide enough to carry a large bale of roughage. The length of floor chains 30R and 30L can vary to hold any number of bales from one to four in succession. Floor chain 30R is deposed between idler gear 32F and 32D and idler shaft 32E and drive gears 19C and 19D which are secured to drive shaft 21R which is driven through right-angle gear box 18R by hydraulic motor 20R.

Activation of hydraulic motor 20R is shown in FIG. 3. Hydraulic hose 42A carries pressurized hydraulic fluid from tractor hydraulic system (not shown) to hydraulic motor 20R. When the tractor hydraulics are activated the bale, or bales, on floor chain 30R will move forward at a given speed to be processed by shredders 28 shown best in FIG. 2.

Shredders 28 are turned by chains 24C, 24B, and 24A and gears 26A and 26B. Gear 22 is powered by tractor PTO through PTO shaft 10, double-out gear box 12, shaft 11B, right-angle gear box 11C, shaft 11A, and gear box 11D. Hood 38 contains the processed roughage and allows it to fall on conveyor chain 16 which is deposed between idler gears 15A, 15B and idler shaft 15C and drive gears 17A and 17B which are turned by drive shaft 17C, turned by right-angle gear box 14, turned by shaft 13, turned by double-out gear box 12, turned by PTO shaft 10, which is turned by tractor PTO output shaft (not shown). Thus, a primary conveyor system including the conveyor chain 30R, the shredder 28 and the conveyor chain 16 delivers the processed roughage through opening 40.

Pressurized hydraulic fluid passes through hydraulic motor 20R, causing it to be activated. It is then routed through hydraulic hose 42B (best shown in FIG. 3) to flow control divertor 44A. The pressurized hydraulic fluid is then channeled through hydraulic hose 42C to hydraulic motor 20L which turns right-angle gear box 18L (best illustrated in FIG. 1) which turns drive shaft 21L which turns drive gears 19A and 19B which move floor chain 30L forward. Floor chain 30L is a continuous floor chain and deposed between drive gears 19A and 19B and idler gears 32A and 32C and idler shaft 32B. The bale, or bales, on auxiliary floor conveyor chain 30L would preferably consist of a bale of roughage differing in nutritional value than the bale, or bales, on floor chain 30R. Varying amounts of pressurized hydraulic fluid are diverted around hydraulic motor 20L (best illustrated in FIG. 3) by flow control divertor 44A through hydraulic hose 42D and returned through hydraulic hose 42E to return side of tractor hydraulic system (not shown). The speed that hydraulic motor 20L turns will vary according to the amount of pressurized hydraulic fluid diverted around, rather than through, hydraulic motor 20L. By this process, the predetermined speed at which the bales are carried to shredder 28 (FIG. 2) on floor chain 30L will vary from the given speed at which the bales on floor chain 30R are carried to shredders 28. Thus, the proportions of roughage on floor chain 30L that has been processed by shredders 28 can be varied from the proportions of roughage on floor chain 30R that has been processed by shredders 28. Conveyor chain 16 discharges selected relative proportions of the processed ration through opening 40 and deposits it into a feed bunk ready for livestock consumption.

Floor 46 (FIG. 2) is connected to mobile frame 34 which rides on wheels 36. The frame 34 can be pulled by a tractor (not shown) and deliver the selected feed ration to livestock for consumption immediately after being processed. Use of the preferred embodiment will reduce the number of machines and the man hours required to meet the nutritional needs of livestock being fed solely, or mostly, roughage. In addition, the embodiment can more efficiently and economically combine large bales of roughage of differing nutritional values in varied ratios while increasing the palatability of the feed by processing it and providing immediate delivery of the ration to the livestock.

While the above description contains many specificities, they should not be construed to as limitations on the scope of the invention, but rather as an exemplification of one preferred embodiment thereof. Many other variations are possible. For example, the whole invention can be mounted on a tractor for additional mobility. An additional flow control divertor can be added to make the speed of both floor chains adjustable. An additional flow control divertor and hydraulic motor can be added to run the dispensing conveyor chain instead of the PTO drive. The hydraulic schematics can be run individually and through flow divertors rather than through a series. Pulleys and belts can be used in place of gears and chains.

Figure 4:
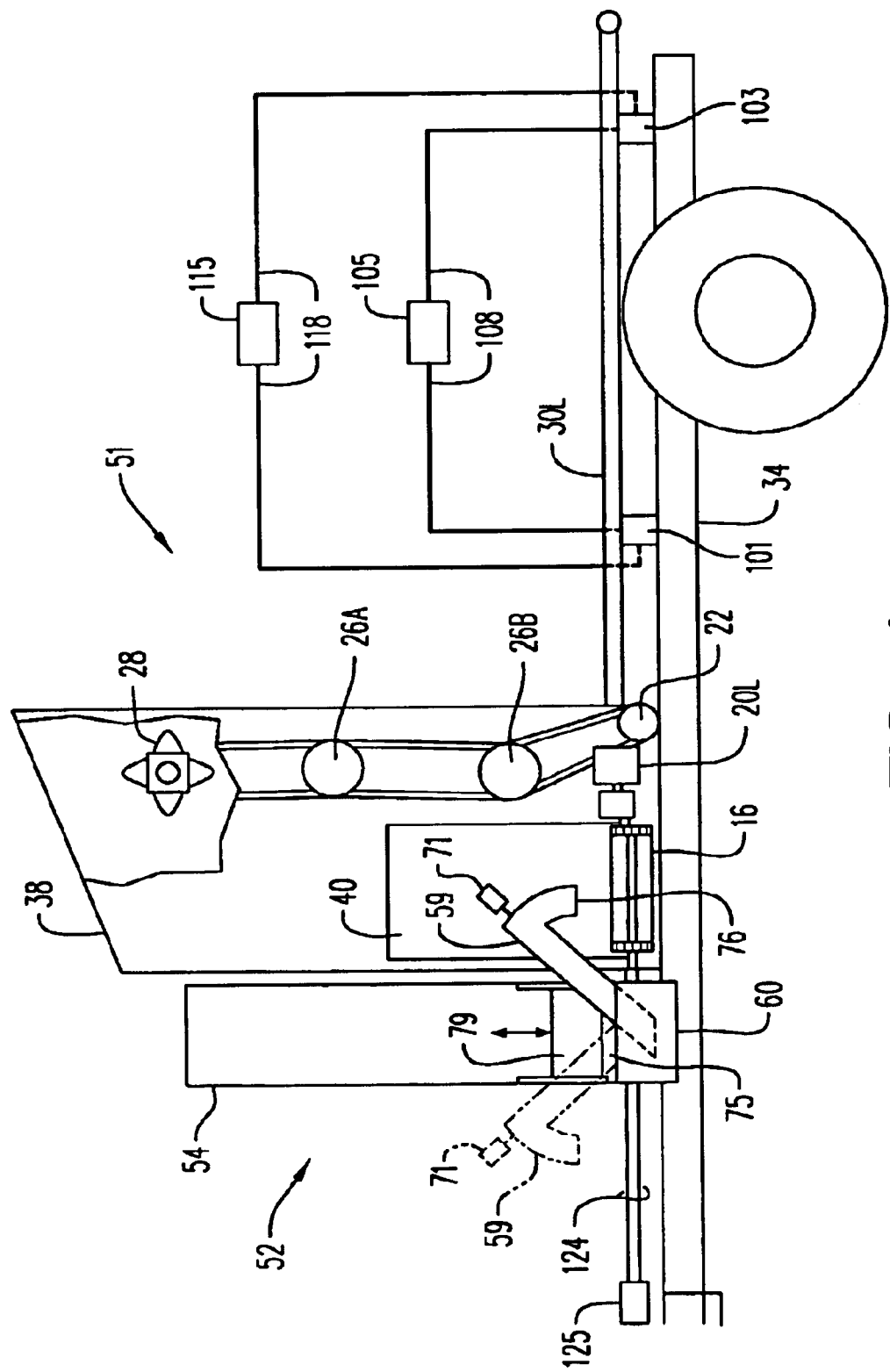
FIG. 4 is a side elevational view of another embodiment of the invention.
Figure 5:
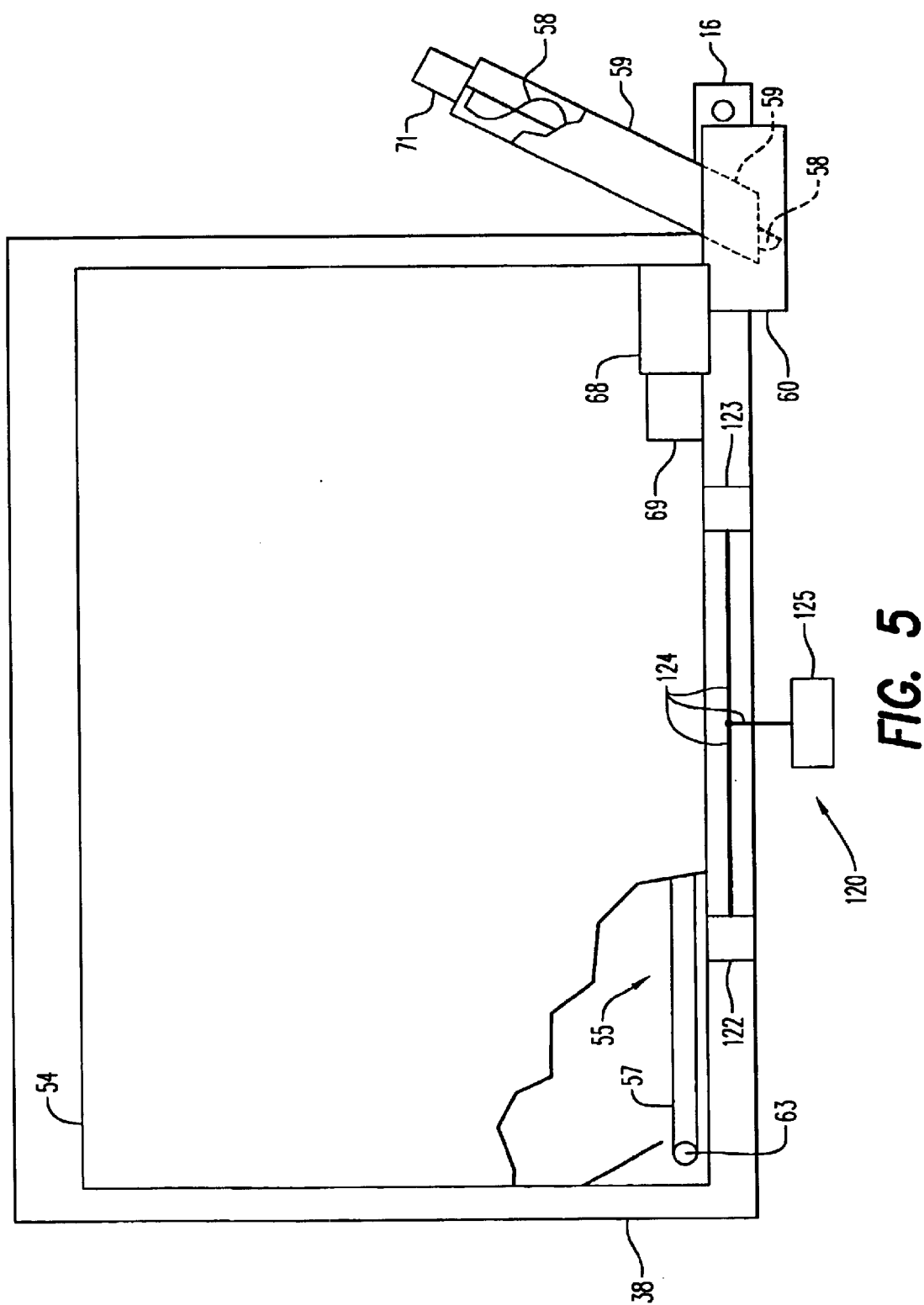
FIG. 5 is a front elevational view of the embodiment shown in FIG. 4.
Figure 6:
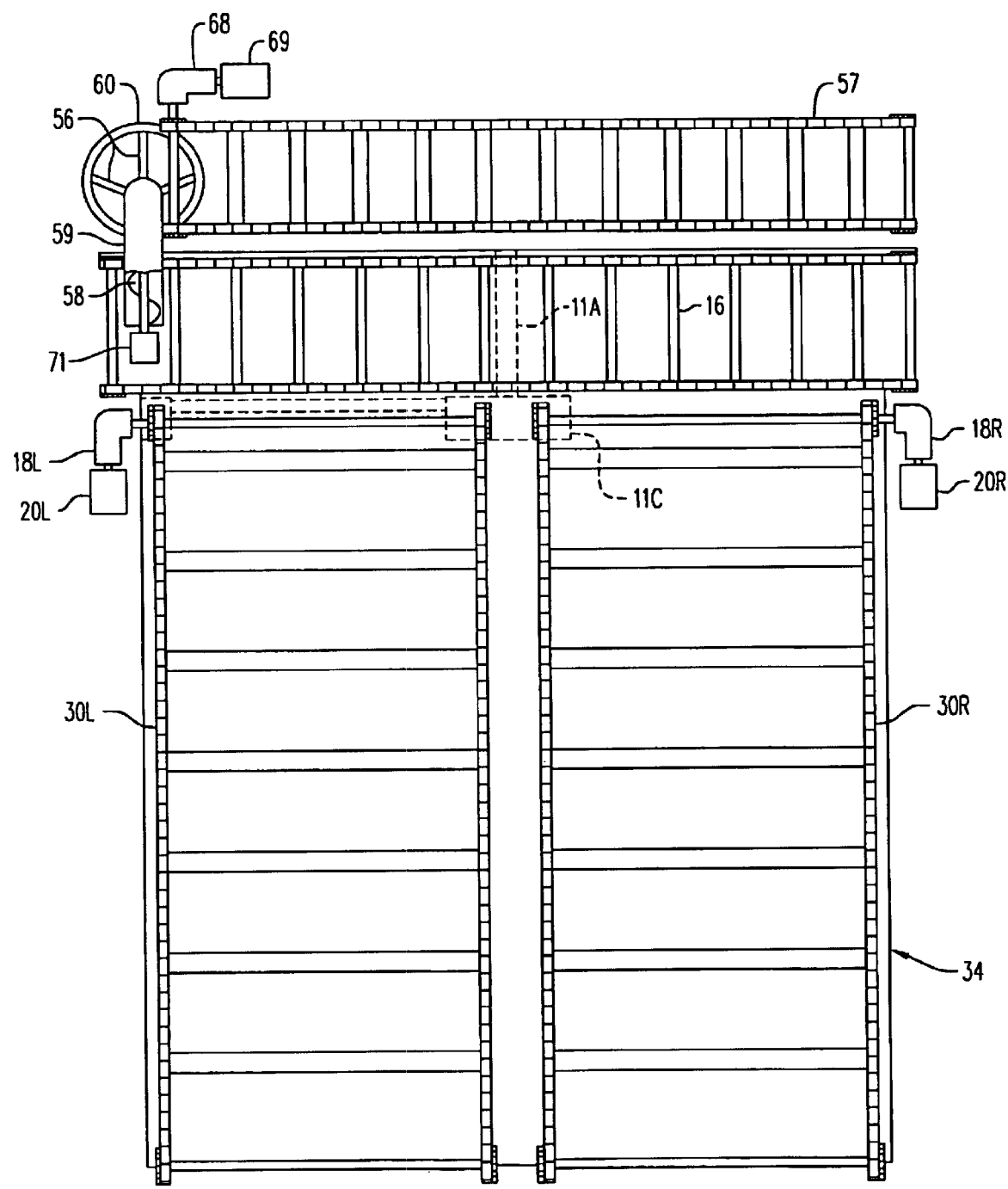
FIG. 6 is a cutaway top view of the embodiment shown in FIGS. 4 and 5.

Illustrated in FIGS. 4–6 is another embodiment 51 of the invention in which components corresponding to those in the embodiment of FIGS. 1 and 2 bear the same reference numerals. Added to the embodiment 51 is a particulate feed material dispenser section 52 mounted on the mobile frame 34 forwardly adjacent to the shredder section 38. Included in the dispenser section 52 are a bin 54 for feed material such as grain and an auxiliary conveyor system 55 for transporting feed material from the bin 54 to a region adjacent to the discharge section 40. The conveyor system 55 includes a chain conveyor 57 mounted at the bottom of the bin 54 and an auger 58 (FIGS. 5 and 6) mounted in a discharge chute 59 projecting out of an open upper end of a cylindrical grain slump 60. Supporting the chute 59 in the slump 60 are a plurality of struts 56. Preferably, the slump 60 is pivotally mounted on the frame 34 so as to allow movement of the discharge chute 59 relative to the discharge section 40 as shown in FIG. 4. Supporting the chain conveyor 57 are idler gears 61, 62 mounted on an idler shaft 63 and drive gears 65, 66 fixed to a drive shaft 67. A gear box 68 is operatively coupled to the shaft 67 and driven by a hydraulic drive motor 69. Mounted on an upper surface of the chute 59 is a hydraulic drive motor 71 operatively coupled to the auger 58.

During use of the dispenser section 52, grain retained in the bin 54 is conveyed by the chain conveyor 57 through an opening 75 (FIG. 4) and deposited in the slump 60. That grain then is conveyed upwardly by the auger 58 and discharged through an outlet opening 76 in the chute 59. The discharged grain is deposited on the conveyor 16 and thereby combined with the shredded roughage received from the shredders 28. However, the slump 60 and chute 59 can be rotated into other positions to provide grain discharge into other adjacent areas as, for example, directly into a feed bunker (not shown). By controlling the relative speeds of the bale conveyors 30L and 30R and the rate at which grain is discharged from the chute 59, the relative proportions of combined particulate feed and roughage feed can be selectively varied to provide a desired and economical feed ration. The grain discharge rate can be selectively and independently varied by vertical adjustment of a door 79 covering the opening 75 or by controlling the speeds of the chain conveyor 57 or auger 58 as described hereinafter or by any combination thereof.

Figure 7:
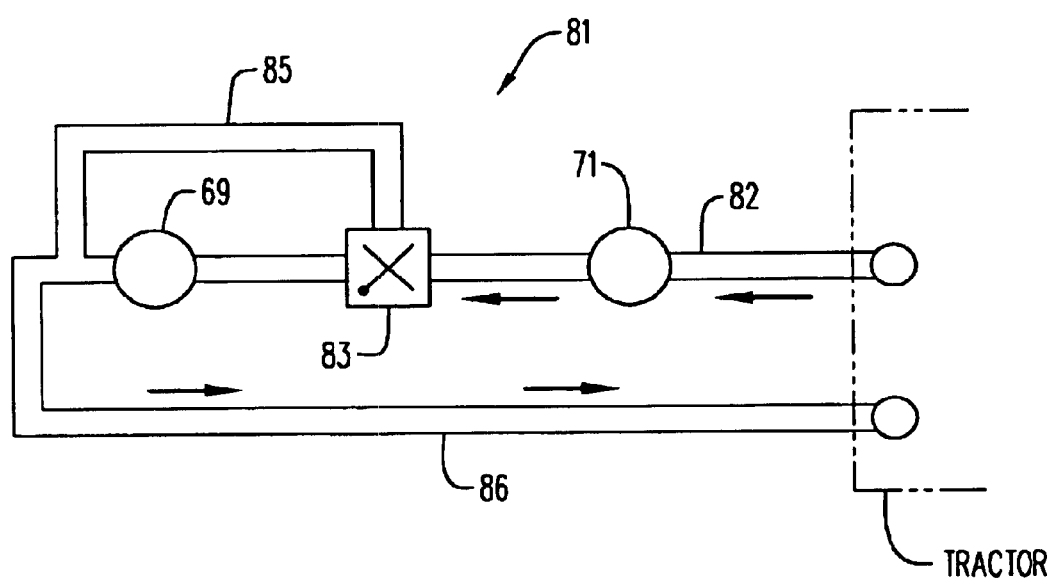
FIGS. 7–9 are hydraulic control systems for the embodiment shown in FIGS. 4–6.

FIG. 7 illustrates one hydraulic system embodiment 81 for independently controlling the speed of the conveyor 57. A hydraulic input line 82 is connected between a pump (not shown) on the tractor to a divertor valve 83 via the motor 71. The divertor valve 83 can be adjusted to selectively divide fluid flow between the motor 69 and a bypass line 85 for return in a return line 86. Thus, speed of the conveyor 57 coupled to the motor 69 is selectively varied by adjustment of the diversion valve 83.

Figure 8:
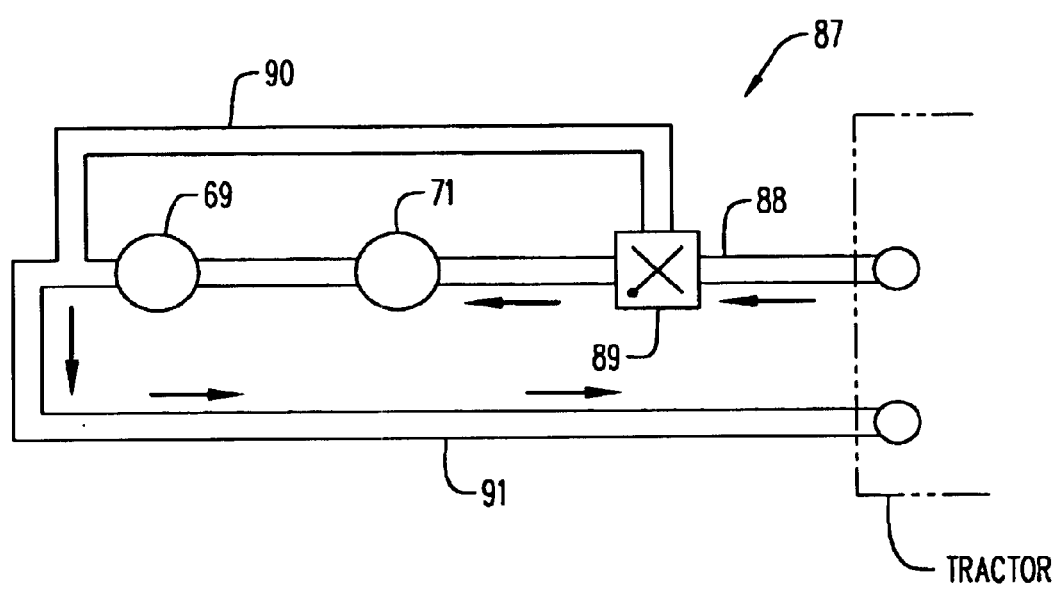

Another hydraulic system embodiment 87 is depicted in FIG. 8. Connected to a pump (not shown) by an input line 88 is a series combination of a divertor valve 89, the motor 69 and the motor 71. A bypass line 90 is connected between the divertor valve 89 and a return line 91. By selective adjustment of the divertor valve 89, the speeds of the chain conveyor 57 and the auger 58 can be varied to provide a desired rate of grain discharge from the chute 59.

Figure 9:
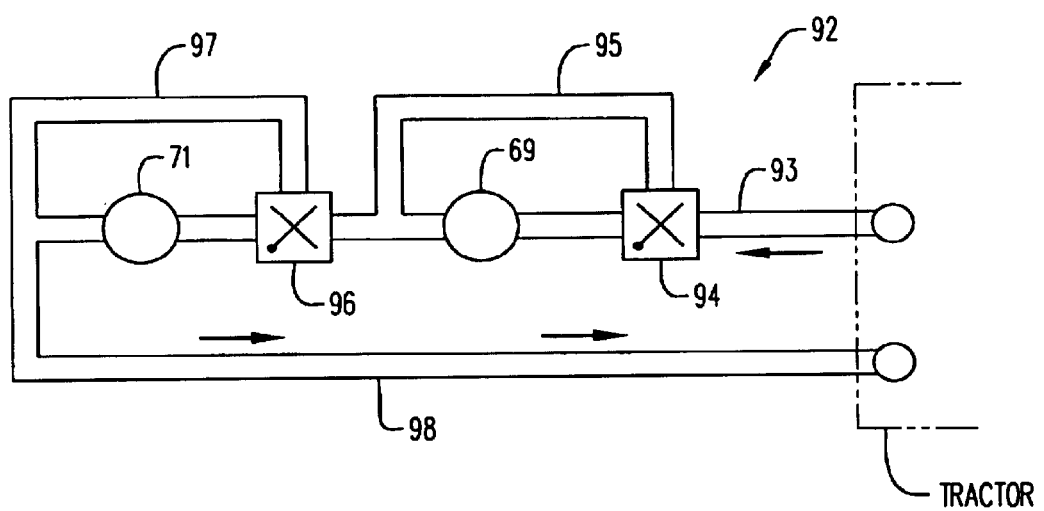

FIG. 9 illustrates another hydraulic system embodiment 92 which provides independent speed adjustments of the chain conveyor 57 and auger 58. An input line 93 is connected between a pump (not shown) and a divertor valve 94 which feeds the motor 69 and a bypass line 95. Connected between the motor 69 and bypass line 95 is a second divertor valve 96 which feeds a bypass line 97 and the motor 71 both of which are connected to a return line 98. By selectively and independently adjusting the divertor valve 94 and 96, independent speed control of the chain conveyor 57 and auger 58 can be obtained to selectively vary the rate of grain discharge from the discharge chute 59.

As shown in FIGS. 1 and 4, a scale system 100 is provided for weighing feed on the left conveyor chain 30L. Included in the scale system 100 are load cells or weigh bars 101, 102, 103 and 104 supporting a floor section 107 under the left conveyor chain 30L, a scale monitor 105 and electrical lines 108 which transmit signals from the cells 101–104 to the scale monitor 105. Similarly, a scale system 110 is provided for weighing feed on the right conveyor chain 30R. The scale system 110 includes load cells or weigh bars 111, 112, 113 and 114 supporting a floor section 110 under the right conveyor chain 30R, a scale monitor 115 and electrical lines 118 for transmitting signals therebetween. Using the feed weight measurements furnished by the scale systems 100, 110, an operator can establish for the conveyor chains 30L and 30R feed rates required to provide a desired feed blend for the roughage discharged by the conveyor chain 16.

FIGS. 4 and 5 further illustrate a scale system 120 for weighing the particulate feed material loaded into the bin 54. Included in the scale system 120 are load cells or weigh bars 122, 123 supporting the bin 54, a scale monitor 125 and electrical lines 124 which transmit signals from the cells 122, 123 to the scale monitor 125. Using the weight measurements furnished by the scale system 120, an operator can establish from the bin 54 a particulate material feed rate required to provide a desired blend of roughage and particulate feed discharged by, respectively, the conveyor chain 16 and the chute 59.

Figure 10:
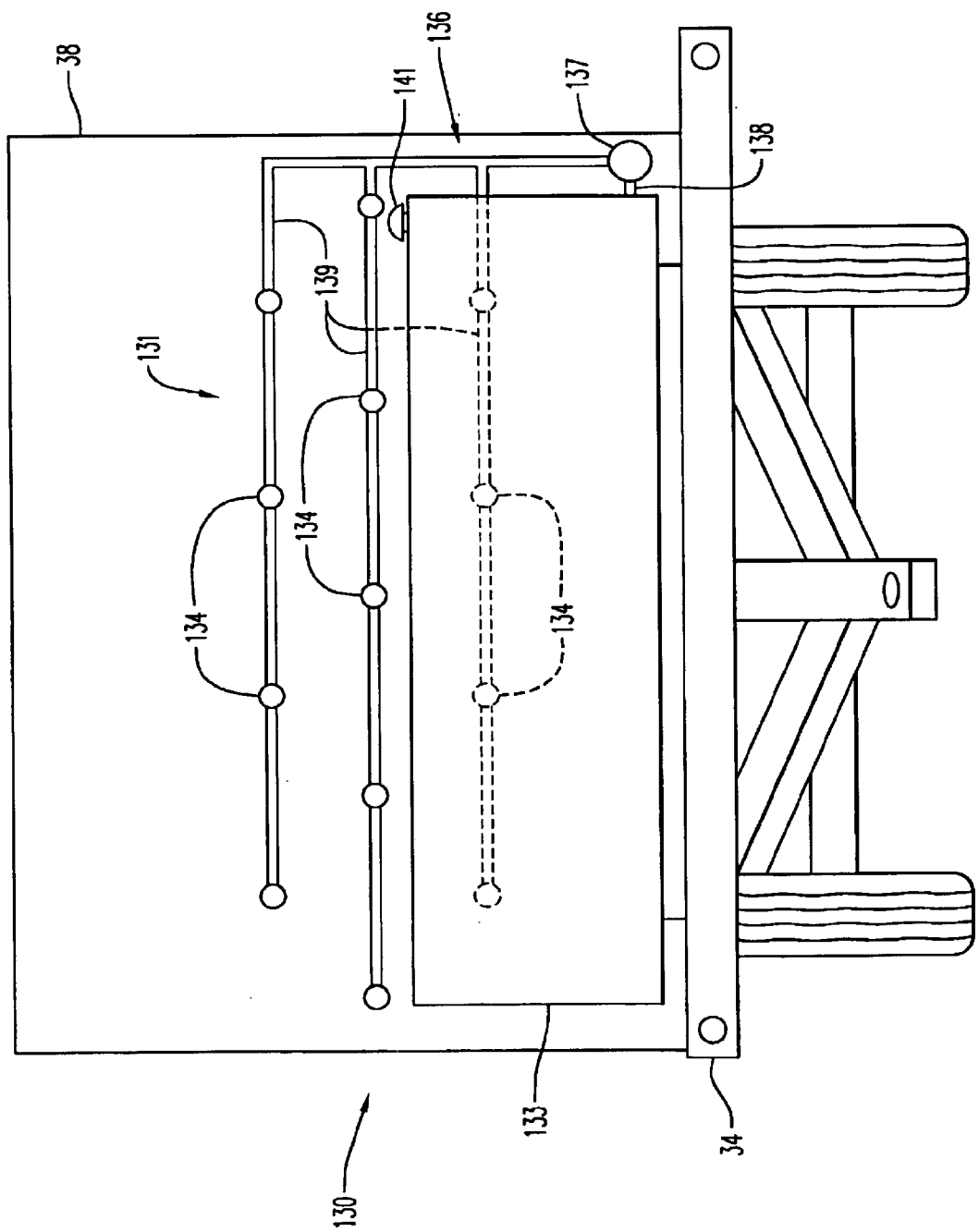
FIG. 10 is a front elevational view of another embodiment of the invention.

Another embodiment 130 is shown in FIG. 10. The embodiment 130 includes all portions of the FIGS. 1–3 embodiment although certain components thereof are omitted to enhance clarity. Added to embodiment 130 is a feed supplement liquid dispensing system 131 including a tank 133 mounted on the frame 34, a plurality of nozzles 134 mounted on the hood 38, and a liquid circulator system 136 connected therebetween. The circulator system 136 consists of a variable speed liquid pump 137, a liquid line 138 between the tank 133 and the pump 137 and liquid lines 139 between the pump 137 and the nozzles 134. A removable cap 141 accommodates filling of the tank 133 with a suitable liquid feed supplement.

The pump 137 can be selectively activated to provide a desired rate of fluid flow between the tank 133 and the nozzles 134 which project through the hood 38 at vertically and horizontally distributed locations. Discharged liquid feed is sprayed by the nozzles 134 onto the shredded roughage being shredded by the shredders 28 (FIG. 2). By selectively controlling the pump 137 and the conveyor chains 30L, 30R an operator can provide a desired blend of roughage and liquid feed for discharge by the conveyor chain 16. It should be understood that the liquid dispensing system 131 of embodiment 130 can be added as well to the embodiment depicted in FIGS. 4–6.

Figure 11:
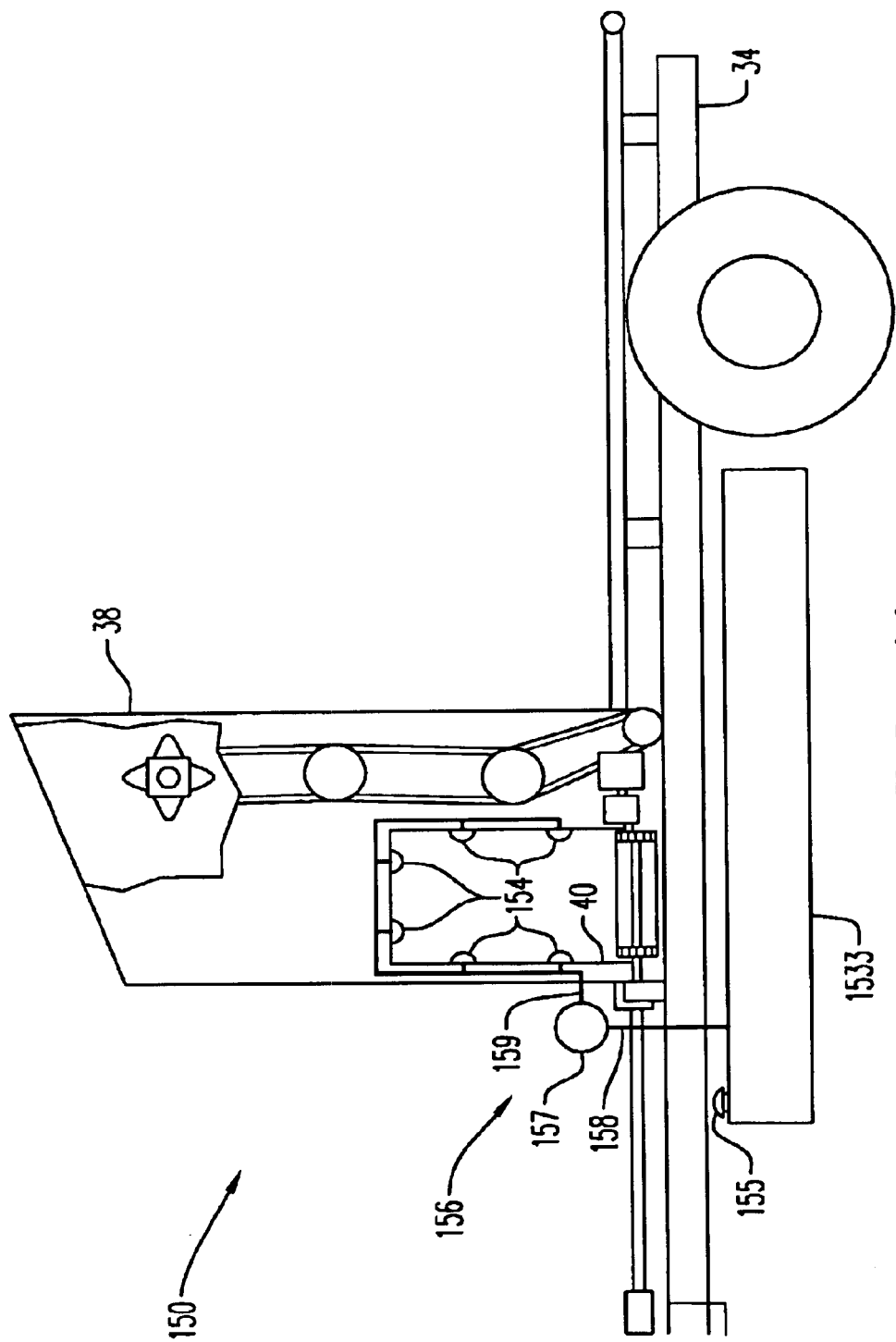
FIG. 11 is a side elevational view of another embodiment of the invention.

FIG. 11 illustrates another embodiment 150 which also includes all portions of the FIGS. 1–3 embodiment although certain components thereof are omitted to enhance clarity. Added to the embodiment 150 is a feed supplement liquid dispensing system 151 including a tank 153 mounted under the frame 34, a plurality of nozzles 154 distributed around the discharge opening 40 of the hood 38, and a liquid circulator system 156 connected therebetween. The circulator system 156 consists of a variable speed liquid pump 157, a liquid line 158 between the tank 153 and the pump 157 and liquid lines 159 between the pump 157 and the nozzles 154. A cap 161 allows filling of the tank 153 with a feed supplement liquid.

Selective activation of the pump 157 produces a desired liquid flow rate from the tank 153 to the nozzles 154. Discharged feed liquid is sprayed by the nozzles 154 onto the shredded roughage being discharged by the conveyor chain 16. By selectively controlling the pump 157 and the conveyor chains 30L, 30R an operator can produce a desired blend of roughage and liquid feed supplement. Again, it should be understood that the dispensing system 151 of embodiment 150 can be added also to the embodiment of FIGS. 4–6. In that case, the chute 59 adds particulate feed matter from the bin 54 providing a desired blend of roughage, particulate feed, and liquid feed supplement.

Figure 12:
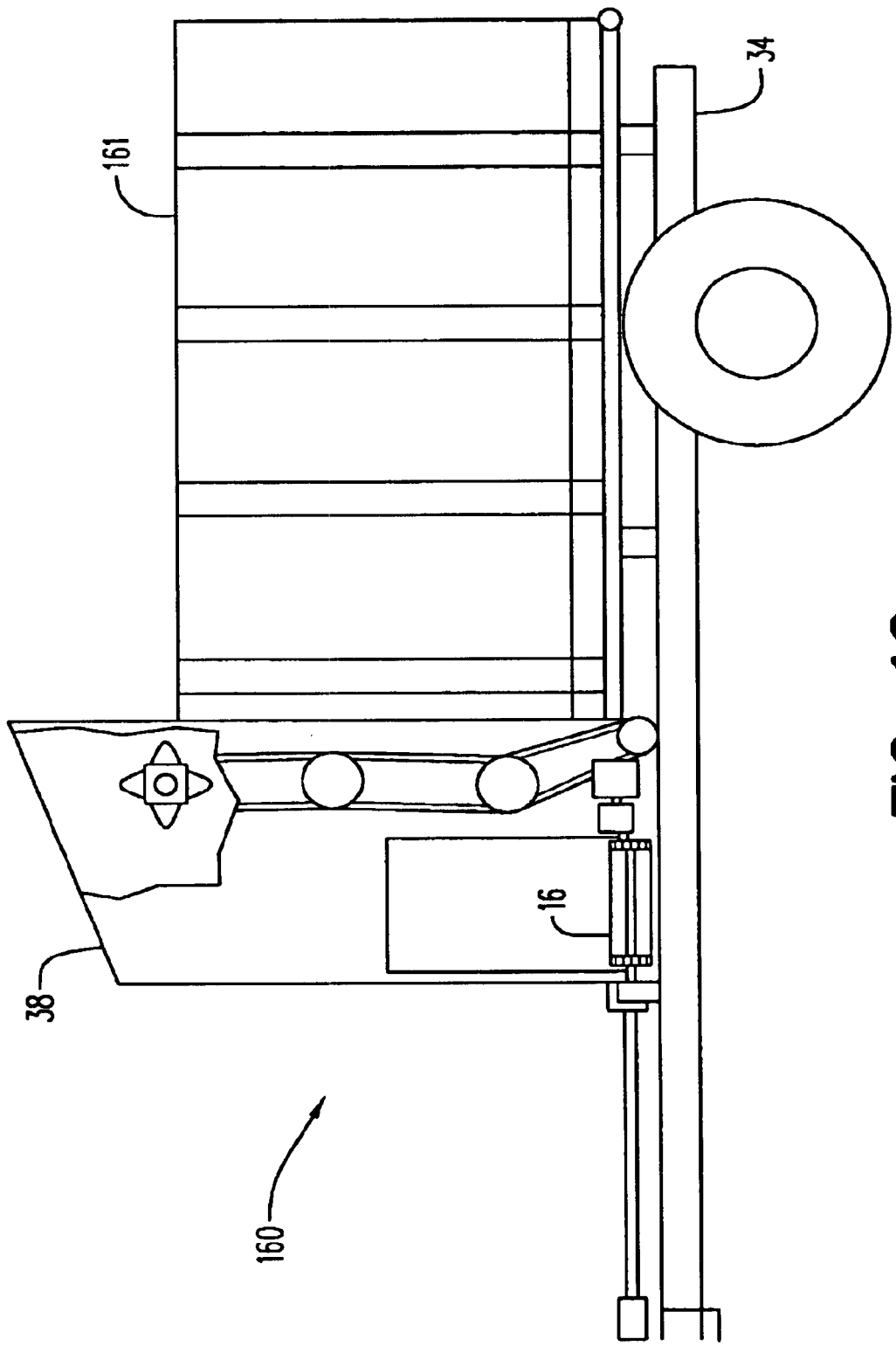
FIG. 12 is a side elevational view of another embodiment of the invention.

In another embodiment 160 shown in FIG. 12 partitions 161 are mounted on the frame 34 of the FIGS. 1–3 embodiment. A vertical partition 161 is positioned along each opposite edge of the frame 34 and between the conveyor chains 30L, 30R and floor sections 107, 110. The partitions 161 establish above each chain separated volumes which can be filled with desired particulate feed materials having different nutrient values. In that manner, the embodiment 160 can produce a desired blend of different particulate feed materials.

Obviously, many modifications and variations of the present invention are possible in light of the above teachings. It is to be understood, therefore, that the invention can be practiced otherwise than as specifically described.

What is claimed is:

1. A roughage bale processing and dispensing method comprising the following steps:
   providing one bale of roughage having a given nutritional value;
   providing another bale of roughage having a predetermined nutritional value substantially different than said given nutritional value;
   providing a source of particulate feed material;
   mechanically conveying said feed material to a discharge region at a given quantity rate;
   conveying said one bale into a shredder mechanism at a given speed;
   simultaneously conveying said another bale into the shredder mechanism at a predetermined speed different than said given speed;
   simultaneously conveying the resultant shredded contents of said one bale and said another bale to the discharge region for combination with said mechanically conveyed feed material; and
   selectively controlling the ratios of said given speed and said predetermined speed to said given rate dependent upon the relative nutritional values of said one bale, said another bale and said feed material so as to create a combined feed having a desired combined nutritional value.

2. A method according to claim 1 wherein said conveying steps comprise the steps of loading the one bale onto a first conveyor arranged to feed the one bale into the shredder mechanism, loading the another bale onto a second conveyor arranged to feed the another bale into the shredder mechanism, and controlling the ratio of said given speed to said predetermined speed dependent upon the relative nutritional value of the one and another bales.

3. A method according to claim 2 wherein said combining steps comprise the steps of feeding the shredded contents onto a third conveyor arranged to convey the contents to the discharge region, and transporting said feed material to the discharge region with a conveyor system.

4. A method according to claim 3 including the step of selectively controlling the rate at which said conveyor system transports said feed material.

5. A livestock feeding apparatus comprising:
   a mobile frame defining one section for supporting a bale of roughage and another section for supporting a particulate feed material;
   primary conveyor means comprising shredder means, a first conveyor for moving the bale into said shredder means, and a roughage conveyor system for receiving from said shredder means the shredded roughage and discharging the shredded roughage from said mobile frame at a first discharge rate;
   auxiliary conveyor means for discharging the particulate feed material from said mobile frame at a second discharge rate, and wherein said primary conveyor means and said auxiliary conveyor means are arranged to combine the shredded roughage and particulate feed materials discharged from said mobile frame;
   a control system for selectively controlling the ratio of said first and second discharge rates to provide a desired nutritional value for the combined shredded roughage and particulate feed material; and
   one scale means for weighing the roughage bale supported by said one section; and another scale means for weighing the particulate feed material supported by said second section.

6. An apparatus according to claim 5 wherein said auxiliary conveyor comprises a chute movable relative to said mobile frame and an auger for moving the particulate material out of said chute.

7. An apparatus according to claim 6 wherein said another section includes a bin for retaining the particulate feed material and said auxiliary conveyor means further comprises an intermediate conveyor for conveying the particulate feed material from said bin to said auger.

8. An apparatus according to claim 5 wherein said auxiliary conveyor means comprises a discharge chute, and an auger for moving the particulate feed material out of said discharge chute.

9. An apparatus according to claim 8 wherein said discharge chute is movable relative to said mobile frame.

10. An apparatus according to claim 5 including a tank for containing liquid feed and mounted on said mobile frame, and a liquid dispensing means for circulating liquid from said tank onto the shredded content of the roughage.

11. An apparatus according to claim 10 wherein said dispensing means comprises a liquid circulator means for providing a variable flow of the liquid feed.

12. An apparatus according to claim 11 wherein said dispensing means further comprises a plurality of nozzles distributed above said conveyor system and arranged to dispense the liquid feed onto the shredded content.

13. An apparatus according to claim 5 wherein said one section is adapted to support another bale of roughage and said primary conveyor means comprises a second conveyor for moving the another bale into said shredder means.

14. An apparatus according to claim 13 including a tank for containing liquid feed and mounted on said mobile frame, and a liquid dispensing means for circulating liquid from said tank onto the shredded content of the roughage.

15. An apparatus according to claim 14 wherein said dispensing means comprises a liquid circulator means for providing a variable flow of the liquid feed.

16. An apparatus according to claim 15 wherein said dispensing means further comprises a plurality of nozzles distributed above said conveyor system and arranged to dispense the liquid feed onto the shredded content.

17. A livestock feeding apparatus comprising:

a mobile frame defining one section for supporting a first feed material and another section for supporting a second feed material;

primary conveyor means for discharging the first feed material from said mobile frame at a first discharge rate;

auxiliary conveyor means for discharging the second feed material from said mobile frame at a second discharge rate, and wherein said primary conveyor means and said auxiliary conveyor means are arranged to combine the first and second feed materials discharged from said mobile frame;

one scale means for weighing the first feed material supported by said one section;

another scale means for weighing the second feed material supported by said second section; and a control system for selectively varying the ratio of said first and second discharge rates.

\* \* \* \* \*